US010059608B2

(12) United States Patent
Ritchie et al.

(10) Patent No.: US 10,059,608 B2
(45) Date of Patent: Aug. 28, 2018

(54) METHOD AND PLANT FOR TREATMENT OF AQUEOUS DISPERSION

(71) Applicant: KOLINA LIMITED, Hertfordshire (GB)

(72) Inventors: Daniel Thomas Exley Ritchie, Harrogate (GB); Roger Nicholas Hensby, Harrogate (GB)

(73) Assignee: KOLINA LIMITED, Hertfordshire (GB)

( * ) Notice: Subject to any disclaimer, the term of this patent is extended or adjusted under 35 U.S.C. 154(b) by 74 days.

(21) Appl. No.: 15/039,920

(22) PCT Filed: Nov. 25, 2014

(86) PCT No.: PCT/GB2014/053469
§ 371 (c)(1),
(2) Date: May 27, 2016

(87) PCT Pub. No.: WO2015/079211
PCT Pub. Date: Jun. 4, 2015

(65) Prior Publication Data
US 2017/0029295 A1 Feb. 2, 2017

(30) Foreign Application Priority Data

Nov. 29, 2013 (GB) .................................. 1321084.4

(51) Int. Cl.
C02F 1/46 (2006.01)
C02F 1/463 (2006.01)
(Continued)

(52) U.S. Cl.
CPC .............. *C02F 1/463* (2013.01); *B01D 17/06* (2013.01); *B03D 1/1431* (2013.01);
(Continued)

(58) Field of Classification Search
None
See application file for complete search history.

(56) References Cited

U.S. PATENT DOCUMENTS 5,240,600 A 8/1993 Wang et al.
6,346,197 B1 2/2002 Stephenson et al.
(Continued)

FOREIGN PATENT DOCUMENTS

JP 2004066037 3/2004

OTHER PUBLICATIONS

International Search Report for PCT/GB2014/053469, dated Mar. 3, 2015.
(Continued)

*Primary Examiner* — Arun S Phasge
(74) *Attorney, Agent, or Firm* — Stephen J. Weyer, Esq.; Stites & Harbison, PLLC

(57) ABSTRACT

A plant for treatment of a waste water stream comprising fat includes pre-treatment apparatus for removal of liquid oil and gross contaminants, a flow-through assembly for electrocoagulation treatment of a liquid, a floc-separation apparatus arranged for removal of a flocculated fat-containing layer from the aqueous dispersion to provide clarified aqueous solution for disposal and a controller arranged to control voltage and/or current across the electrodes and the flow of the waste water stream through the components of the plant. Also disclosed are methods for using the plant to provide efficient separation with minimized power consumption as flow and contaminant level vary.

18 Claims, 2 Drawing Sheets

Figure 1:
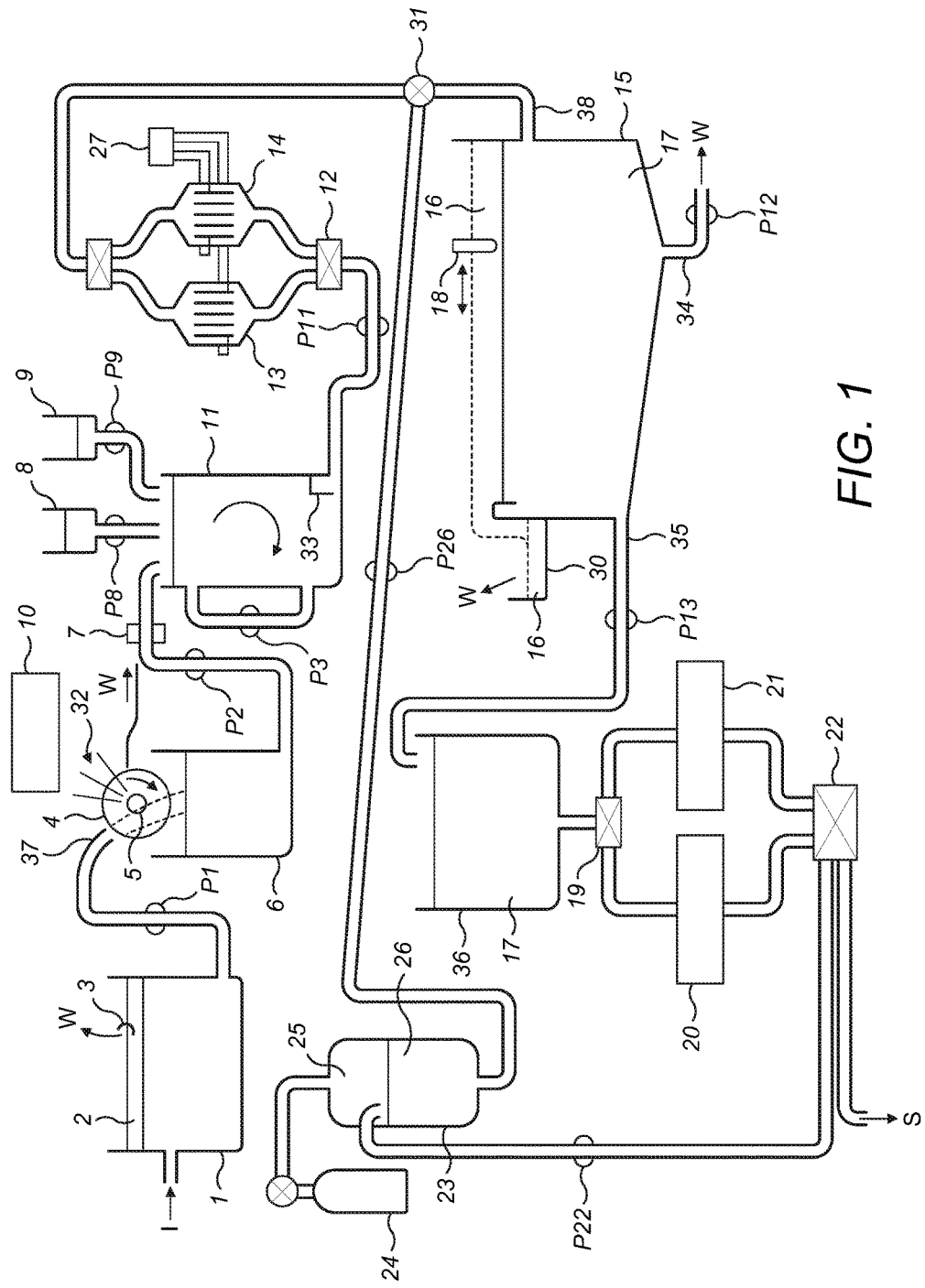

(51) Int. Cl.
- *C02F 1/465* (2006.01)
- *C02F 1/24* (2006.01)
- *B01D 17/06* (2006.01)
- *B03D 1/14* (2006.01)
- *C02F 1/00* (2006.01)
- *C02F 1/40* (2006.01)
- *C02F 1/52* (2006.01)
- *C02F 1/66* (2006.01)
- *C02F 103/32* (2006.01)

(52) U.S. Cl.
CPC ............ *B03D 1/1462* (2013.01); *C02F 1/001* (2013.01); *C02F 1/008* (2013.01); *C02F 1/24* (2013.01); *C02F 1/40* (2013.01); *C02F 1/465* (2013.01); *C02F 1/52* (2013.01); *C02F 1/66* (2013.01); *C02F 2103/32* (2013.01); *C02F 2201/4614* (2013.01); *C02F 2201/46135* (2013.01); *C02F 2209/001* (2013.01); *C02F 2209/03* (2013.01); *C02F 2209/05* (2013.01); *C02F 2209/06* (2013.01); *C02F 2209/11* (2013.01); *C02F 2209/40* (2013.01); *C02F 2303/16* (2013.01); *C02F 2303/22* (2013.01)

(56) References Cited

U.S. PATENT DOCUMENTS

| | | |
|---|---|---|
| 2004/0060876 A1 | 4/2004 | Tipton |
| 2004/0099607 A1 | 5/2004 | Leffler et al. |
| 2007/0199868 A1* | 8/2007 | Volpe .................. C02F 1/463 210/143 |
| 2009/0107915 A1 | 4/2009 | Skinner et al. |
| 2009/0166296 A1 | 7/2009 | Tigani et al. |
| 2011/0266203 A1 | 11/2011 | Frisky |

OTHER PUBLICATIONS

Written Opinion of the International Search Report for PCT/GB2014/053469, dated Mar. 3, 2015.
Intellectual Property Office Search Report under Section 17(5) completed Oct. 31, 2014.

* cited by examiner

METHOD AND PLANT FOR TREATMENT OF AQUEOUS DISPERSION

FIELD

The present invention relates to a method and plant for treatment of waste liquids, in particular for treatment of waste water in the form of aqueous dispersions in order to facilitate removal of particles therefrom so that the purified water may be returned to the environment.

BACKGROUND

Disposal of residual waste water from industrial plants may pose difficult and costly problems. Many chemical manufacturing plants have on-site facilities to treat their waste waters in order to ensure that potential pollutants in the treated waste water are reduced to levels required to comply with local and/or national regulations for disposal of waste water into local sewage treatment systems, rivers, lakes or oceans.

Industrial sites, such as abattoirs, food manufacturing plants, polymer recycling plants and the like, produce large quantities of waste liquids, typically in the form of aqueous dispersions, including particulate matter of various types, such as solid particles as well as particles in the form of liquids such as fatty particles or oil droplets.

Although such sites may be capable of direct connection to the sewage system, local authorities in control of the sewage system may apply limits to the purity or level of contamination of waste water which can enter the sewage system.

In particular, some authorities may impose penalties or fines upon sites when excessively contaminated waste water is allowed to enter the sewage treatment system, or the environment, from the site.

However, such sites may produce waste streams with wide variability in the contaminant levels present. For instance, the concentrations of contaminants present in the waste stream from such a plant may be considerably lower during wash-down and cleaning than they are during normal production operation of the plant.

It is desirable to provide an on-site waste stream treatment plant that is capable of dealing with purification of waste streams having high variability in contaminant content in an efficient manner.

Furthermore, it is desirable to avoid waste water, whilst awaiting treatment, being stored within a manufacturing plant, as this may lead to risk of contamination to the manufactured goods from the stored waste water. Similarly, it is desirable that waste products separated from the waste water are not stored or retained in proximity with the manufacturing plant or manufactured goods.

Hence, there is a need for methods and plant for the efficient, stand-alone treatment of waste liquids from such industrial sites so that water recovered from the waste liquids may be returned to the environment, such as through the local sewage system.

For coarse particles and liquid fats, physical separation by classification and/or skimming is effective, but this may result in a remaining aqueous dispersion of particulate matter which may be difficult to separate from water in an efficient manner. Typically, the particles may be in a colloidal state, in other words having a particle diameter from about 1 to 10,000 nm. Colloidal dispersions may be difficult to separate fully and efficiently.

The stabilisation and aggregation of colloidal dispersions or emulsions of particles in water or in aqueous solutions, has been explained in terms of DLVO theory (an acronym for the workers Derjaguin, Landau, Verwey and Overbeek who developed the theory) which combines the effects of van der Waals attraction with electrical double layer repulsion between dispersed, charged colloidal particles.

Commonly charged colloidal particles (i.e. colloidal particles having the same sign of charge) are stabilised in colloidal dispersions by mutual electrostatic repulsion forces exceeding the attractive van der Waals attraction.

The charged particles may attract counterions, of opposite charge to their charged surfaces, from their aqueous surroundings, resulting in the formation of an electrical double layer (EDL) at the particle surface. This EDL screens the electrical repulsion between particles, and so by formation of a suitable EDL, the electrostatic repulsion between the commonly charged colloidal particles may be sufficiently screened in order to allow van der Waals forces to drive coalescence of the particles into larger, bulk agglomerates or flocs.

For water purification, or for extraction of desired materials from an aqueous dispersion or slurry, in order to remove colloidal particles from water by flocculation, modification of the EDL may be achieved by addition of electrolyte to the colloidal dispersion to be flocculated. However, for water purification, this has the disadvantage that high levels of dissolved electrolyte may remain in the water remaining after flocculated material has been removed.

Electrocoagulation is based upon the use of electrochemical dissolution of an electrode by electrolytic oxidation with $OH^-$ to form counterions of high charge, at the anodes, which can aid flocculation (typically cations such as $Fe^{3+}$ or $Al^{3+}$ for flocculation of fatty particles) without the need for addition of corresponding salt-derived anions into the liquid to be treated (typically $OH^-$ will be the counterions formed in the electrocoagulation process). In parallel with the formation of the cations formed at the anode, gas bubbles (hydrogen) are also formed at the cathode. The term "electrocoagulation" as used herein is also meant to encompass electroprecipitation.

For a typical electrocoagulation system, opposed electrodes may be used to provide a voltage difference across one or more sacrificial electrodes positioned between the opposed electrodes, with the sacrificial electrodes not electrically connected to each other or to the opposed electrodes other than through the liquid being treated. This results in an electrical field being set up across the sacrificial electrodes, causing them to have cathodic and anodic surfaces and causing a current to flow between them and the opposed electrodes, typically with the material of the sacrificial electrodes oxidising and dissolving at the anodic surfaces and hydrogen bubbles being generated at the cathodic surfaces. For instance with sacrificial electrodes of aluminium, aluminium hydroxide is formed at the cathode and can lead to flocculation or co-precipitation of colloidal particles within the liquid to be treated. Typically, a voltage of 50 to 600V may be applied, with a direct current, such as up to 60 A, for instance from 1 to 55 A, say from 5 to 20 A passing between the opposed electrodes.

A problem with electrocoagulation systems is that the aqueous dispersion passing through the electrodes may cause the electrodes to become subject to excessive contamination or coating, which may give rise to the need to replace the electrodes at intervals as they become coated by contaminant during use.

In general, because of the problems associated with such contamination build-up, electrocoagulation has not been seen as a suitable method for the generation of purified water from industrial waste streams containing fat particles, such as those from abattoirs or food manufacturing plants, particularly when the fat and/or electrolyte content of the waste stream is subject to high variability over time.

SUMMARY

It is one aim of the present invention, amongst others, to provide waste water stream treatment plants and methods which are capable of dealing with aqueous waste streams having high variability in fat and/or electrolyte content within the waste stream whilst providing adequate purification of the waste stream to provide low risk of contamination of the environment or sewage system from the resulting clarified waste water. It is also an aim of the invention to provide plant and methods for treatment of aqueous waste streams which address problems known from prior art waste treatment systems or which address other problems, such as those mentioned hereinafter, or otherwise present for waste treatment systems. For instance, one aim of the invention is to provide aqueous waste treatment systems suitable for treatment of waste water streams for which accumulation of waste water cannot be easily halted whilst maintenance is carried out on plant. In particular, it is an aim of the invention to provide plant and methods suitable for efficient purification of water by flotation separation of fatty matter from a waste water stream without excessive addition of flocculant salts. Another aim of the invention is to provide an alternative to prior art methods and apparatuses.

According to the present invention there is provided an apparatus and method as set forth in the appended claims. Other features of the invention will be apparent from the dependent claims, and the description which follows.

Throughout this specification, the term "comprising" or "comprises" means including the component(s) specified but not to the exclusion of the presence of other components. The term "consisting essentially of" or "consists essentially of" means including the components specified but excluding other components except for components added for a purpose other than achieving the technical effect of the invention. The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate, and particularly in the combinations as set out in the accompanying claims. The optional features for each aspect or exemplary embodiment of the invention, as set out herein, are also applicable to any other aspects or exemplary embodiments of the invention where appropriate. In other words, the skilled person reading this specification should consider the optional features for each aspect or embodiment of the invention as interchangeable and combinable between different aspects or exemplary embodiments of the invention.

A first aspect of the invention provides a plant for treatment of a waste water stream comprising fat particles dispersed therein, the plant comprising:

a) a pre-treatment apparatus for separation and removal of liquid oil and gross contaminants from the waste water stream in use to provide a remaining aqueous dispersion comprising fat particles dispersed in aqueous solution,
b) a flow-through assembly arranged for electrocoagulation treatment of the aqueous dispersion, the assembly comprising:
   a flow-through chamber comprising opposed electrodes and sacrificial electrodes positioned therebetween; and
   a power supply arranged to apply a voltage across the electrodes and to cause a current to flow therebetween through the aqueous dispersion in use;
c) a floc-separation apparatus arranged for separation and removal of a flocculated fat-containing layer, formed by flocculation of the fat particles after electrocoagulation treatment of the aqueous dispersion, to provide a remaining clarified aqueous solution; and
d) a controller arranged to control voltage and/or current across the electrodes and the flow of the waste water stream through the components of the plant.

The components of the plant of the first aspect of the invention are suitably arranged so that the waste stream and components derived from the waste stream sequentially pass through the components in the order (a), (b), (c), as set out above, with the flow of the waste stream and its components being controlled through the use of pumps, valves, flow-splitters and the like, under the control of the controller (d).

The controller may be a programmable computer apparatus programmed to put the method of the invention into effect on a suitable plant.

It will be understood that the volumetric flow rate output from a food preparation factory, abattoir, polymer recycling plant or the like may vary over time, and the plant may include a buffer or storage tank for holding part of the waste stream when output rates are higher than a mean value that the plant is tailored to handle, and feeding the remainder of waste stream to the remainder of the plant at a suitable volumetric flow rate. The portion retained in the buffer or storage tank may be fed to the remainder of the plant for treatment at a later time when output rates are lower so that the plant has spare capacity.

The term "waste water stream" as used herein refers to any aqueous waste stream and includes flowable dispersions or slurries of particulate solids or liquids present in a continuous phase of water or aqueous solution. The term particle merely means "small portion" and particles may be of liquid or solid, so for instance the oil droplets in an oil-in-water emulsion used as liquid are referred to herein as oil particles dispersed in a continuous aqueous phase. The term "fat" as used herein includes both solid and liquid fats, with liquid fat also being referred to as "oil" herein when appropriate.

The fat and/or oil in the waste stream may be a natural fat from a renewable resource (such as an animal or vegetable fat or oil) or may be a petrochemical oil and/or fat and/or wax. Typically, fats will have a density which is less than that of water.

The pre-treatment apparatus may comprise a skimming tank for removal of oil from the waste water stream by skimming a floating oil layer from the waste water stream. Such skimming tanks are known in the prior art, for instance from conventional sewage treatment plants.

The pre-treatment apparatus may comprise a screening apparatus arranged for removal of coarse particles from the waste water stream. For instance, the screening apparatus may be a sieve arrangement. One particularly suitable arrangement is the use of a sieve or classifier in the form of the wall of a drum or cylinder rotating about an axis, where the waste stream is arranged to flow through the wall so that coarse particles are retained on an outer face of the drum, with the collected particles removed from the outer face of the drum, for instance by scraping, and sent to waste. The arrangement may include water jets positioned to impinge upon and eject the collected particulates outwards from the outer face of the drum to assist in their removal.

The screening apparatus may suitably be arranged to remove gross contaminants in the form of coarse particles having a classifier or sieve with a mesh size from 60 micrometers to 10 mm, such as from 100 micrometers to 5 mm, for instance from 0.3 mm to 3 mm or more. In order to reduce risk of blockage, a plurality of screening apparatuses may be used in series, with each successive apparatus having a finer mesh than the preceding mesh. The mesh size is defined herein as the diameter of the largest sphere which will pass through the mesh.

The plant of the first aspect of the invention includes a flow-through assembly arranged for electrocoagulation treatment of the aqueous dispersion. The assembly comprises a flow-through chamber comprising opposed electrodes and sacrificial electrodes positioned therebetween; and a power supply arranged to apply a voltage across the electrodes and to cause a current to flow therebetween through the aqueous dispersion in use.

As explained above, the opposed electrodes may be used to provide a voltage difference across one or more sacrificial electrodes positioned between the opposed electrodes, with the sacrificial electrodes not electrically connected to each other or to the opposed electrodes other than through the liquid. An electrical field is thus set up across the sacrificial electrodes, causing them to have cathodic and anodic surfaces and causing a current to flow between them and the opposed electrodes, with the material of the sacrificial electrodes oxidising and dissolving at the anodic surfaces and hydrogen bubbles being generated at the cathodic surfaces. For instance with sacrificial electrodes of aluminium, aluminium hydroxide is formed at the cathode and can lead to flocculation or co-precipitation of colloidal particles within the liquid to be treated. Typically, a voltage of 50 to 600V may be applied, with a direct current, such as up to 60 A, for instance from 1 to 55 A, say from 5 to 20 A passing between the opposed electrodes.

The sacrificial electrodes may be of any suitable material for electrochemical dissolution, depending upon the nature of the waste water stream to be treated. Typically, the sacrificial electrodes may be of metal, and may comprise or consist essentially of aluminium or iron (e.g. steel). Aluminium-based electrodes (i.e. of an alloy comprising aluminium as a major component) may be particularly useful for the treatment of a waste water stream in order to provide coagulation and coalescence of the particles of fatty materials dispersed therein. The opposed electrodes may suitably be of a material having a higher resistance to electrochemical dissolution then the sacrificial electrodes. For instance, if the sacrificial electrodes are of aluminium, the opposed electrodes may be of steel. If the sacrificial electrodes are of one grade of steel, the opposed electrodes may be of a different grade of steel, more resistant to electrolytic dissolution than the steel of the sacrificial electrodes.

Following the passage of the aqueous dispersion through the electrocoagulation (EC) apparatus, the aqueous dispersion will contain flocculant donated by dissolution of the sacrificial electrodes and this will lead to flocculation of the fat particles, along with other dispersed and suspended particles, as double layer repulsion is decreased as a result of the presence of the donated flocculant. The aqueous dispersion may also contain gas bubbles or dissolved gas (typically hydrogen gas) generated at the cathodic surfaces of the electrodes of the electrocoagulation apparatus in use.

The plant of the first aspect of the invention may further comprise a gas solution generation apparatus arranged to generate an aqueous solution of a gas for blending with the aqueous dispersion. Preferably, the gas solution is an aqueous solution of gas which is supersaturated with the gas at the conditions (temperature and pressure) prevailing on blending with the aqueous dispersion. By the term "supersaturated" it is meant that the gas is present at a concentration in excess of its solubility under the conditions present after blending, with the consequence that gas bubbles may be nucleated as the gas comes out of solution on or following blending. Typically this may be achieved by the gas solution generation apparatus having a chamber arranged for dissolving a gas into aqueous solution with the gas at a pressure in excess of atmospheric pressure to form the gas solution in use (i.e. with the gas at a pressure in excess of atmospheric pressure, such as at 2 Bar or more, for instance 5 Bar or more). The plant may further comprises a pump arranged for blending the gas solution with the aqueous dispersion through a valve arranged to maintain the gas solution at a pressure higher than atmospheric pressure, prior to blending, in use. The aqueous dispersion on the other side of the valve, on blending with the solution of gas, may suitably be at or near atmospheric pressure. The gas used may be compressed air or nitrogen or carbon dioxide, for instance, but any suitable gas soluble in water or aqueous solution may be employed. Compressed air is preferred as a convenient and readily available option. This may, for instance, be generated in situ using an air compressor apparatus, rather than requiring a compressed gas supply from using compressed gas cylinders.

Preferably, the valve is positioned to blend the aqueous solution of gas with the aqueous dispersion after the flow-through electrocoagulation assembly, but before or at entry into the floc-separation apparatus.

For removal of dispersed particulate matter from water, the presence of gas bubbles from the cathodic portions of the electrocoagulation apparatus, subsequently entrained within the resulting flocculate of particulate matter, may assist in removal of the particulate matter by flotation and bulk separation. The particulate matter, particularly when comprising fatty matter, is typically of lower density than water after flocculation and the presence of entrained gas bubbles may further reduce the density of the flocculate formed, assisting in speeding separation by flotation of the flocculate to form a separate layer for subsequent removal to leave purified water.

Without wishing to be bound by any theory, it is believed that the combination of the supersaturated gas solution with the post-electrocoagulation aqueous dispersion, containing hydrogen in solution, or as bubbles, may lead to a synergistic generation of gas bubbles having a size suitable to assist in the flotation and separation of flocculated fatty particles in the floc-separation apparatus. It has been found that this effect can be used to provide more rapid flow of the aqueous dispersion through a floc-separation apparatus whilst still achieving the same degree of clarification at the outlet of the floc-separation apparatus. In other words, the synergistic combination of gas generated by electrocoagulation treatment and gas from the aqueous solution of gas formed under pressure may give rise to speedier separation and flotation of the flocculated fatty matter.

In other words, an aqueous solution of a gas may be blended with the aqueous dispersion of particles, prior to separating the flocculate from the remaining clarified aqueous solution, with the aqueous solution arranged to be supersaturated with the gas on blending with the aqueous dispersion. The blending of the EC-treated dispersion with the supersaturated solution of gas may speed and facilitate separation of the particulate flocculate from clarified aqueous solution.

The plant of the first aspect of the invention may further comprise a composition adjustment apparatus, arranged between the pre-treatment apparatus and the flow-through electrocoagulation apparatus, wherein the composition adjustment apparatus is arranged for measurement and adjustment of the pH and/or conductivity of the aqueous dispersion.

For instance, the composition adjustment apparatus may comprise a balancing tank arranged for mixing or blending by recirculating the aqueous dispersion through the balancing tank, and may also comprise one or more reagent dosing apparatuses arranged for dosing one or more reagents into the balancing tank, in order to bring the aqueous dispersion in the balancing tank to a required pH and/or conductivity.

The composition adjustment apparatus may be useful for adjusting the pH of the final clarified aqueous solution sent to the sewage system/environment after treatment. In the event that authorities or practical environmental considerations require that the pH of the output clarified aqueous solution be within a certain range, such as, for instance, from 6 to 8, then this may be achieved using the composition adjustment apparatus by blending acid or alkali, as required, using the reagent dosing apparatuses. The composition adjustment apparatus may include a pH meter for monitoring the pH of the aqueous dispersion entering the composition adjustment apparatus. by blending acid or alkali, as required, using the reagent dosing apparatuses. The composition adjustment apparatus may include a pH meter for monitoring the pH of the aqueous dispersion entering the composition adjustment apparatus.

The composition adjustment apparatus may also or alternatively be useful for adjusting the electrolyte content of the aqueous dispersion in order to modify the conductivity of the aqueous dispersion. For instance, the waste stream from a plant such as an abattoir, or a food manufacturing plant generating pre-cooked meals, or an ice cream plant, may generate waste streams, in normal operation, which include aqueous slurries including high levels of fats dispersed in aqueous solution containing electrolytes. Typically, during normal operation, the fat levels and electrolyte levels may be related, so that an increase in fat level will typically be accompanied by an increase in electrolyte level, and vice versa. When such a plant is subjected to cleaning by wash-down with water, the resulting effluent may have a substantially reduced electrolyte concentration, correspondingly with a low particulate concentration of fat.

When a concentrated effluent is to be treated, high levels of coagulant may be needed. Typically, the amount of dissolved coagulant from the sacrificial electrodes will increase as the current passing between the opposed electrodes increases. However, when a plant is being washed down and generating a very dilute effluent stream, if may no longer be necessary to have high levels of coagulant present.

As the electrolyte level in the waste stream decreases, the aqueous dispersion in the flow-through electrocoagulation chamber has an increased electrical resistance, and this may result in high power consumption in situations where the particulate fat level is still sufficiently high so that the current has to be maintained at a high level in order to ensure that sufficient coagulant is dissolved to allow fat particle flocculation to proceed adequately.

In such circumstances, it may be advantageous to add electrolyte to the aqueous dispersion in order to reduce the resistivity of the aqueous dispersion so that the Ohmic power consumption of the flow-through electrocoagulation apparatus is decreased. At constant current, the power consumption may be proportional to the resistance so lowering the resistance by adding electrolyte is advantageous. The level of electrolyte required is typically not problematic from an environmental or sewage-treatment perspective, particularly if the electrolyte is sodium chloride, which is a preferred electrolyte for this purpose.

The controller may monitor the conductivity, using a conductivity meter, and control dosing of electrolyte to balance power consumption against the requirements for fat flocculation. The apparatus may include a means for monitoring the fat content of the output clarified aqueous solution as a basis for this balancing, for instance using optical clarity measurement to assess the presence of unacceptable fat levels in the output clarified aqueous solution.

The floc-separation apparatus of the first aspect of the invention may comprise a settling tank arranged for collecting the flocculated fat-containing layer by flotation over the remaining clarified aqueous solution and arranged for separate removal of the aqueous clarified solution and the fat-containing flocculated layer from the settling tank. For instance, the floc-separation apparatus may include a scraper blade arranged for to-and-fro horizontal motion in order to scrape the flocculated fat-containing layer into a drainage sump for subsequent removal to waste, with the clarified aqueous solution merely arranged to drain from a low point of the separation tank for pumping to the next part of the plant.

The plant of the first aspect of the invention may further comprising a particulate filtration apparatus arranged downstream of the floc-separation apparatus and arranged to remove fine particulate solids from the clarified aqueous solution.

The particulate filtration apparatus may comprise a plurality of particulate filters, with the controller is arranged to direct the waste water flow through each particulate filter according to demand and/or a maintenance schedule. Hence, if the passage through a single filter is a rate determining step, for instance at wash-down of the manufacturing site using the plant of the invention to treat its waste stream, the controller may switch the plant to utilise two or more filters. When a clogged filter is due for cleaning or maintenance, then the flow may be switched from the clogged filter to a different filter so that the clogged filter may be cleaned without halting the continued operation of the waste stream treatment plant. The particulate filters may suitably be configured to remove particulate material having a diameter of 2 μm or more such as 5 μm or more, say 10 μm or more. For instance, the particulate filters may have an absolute pore diameter (the diameter of the smallest sphere capable of passing the filter), of from 2 to 500 μm, such as from 5 to 200 μm. Further filters may additionally be present downstream of the particulate filters, such as for ultrafiltration or reverse osmosis filtration.

For cleaning of the particulate filters, the controller may suitably be arranged to control flow through the filtration apparatus to effect cleaning by sediment removal using reverse flow through the particulate filters. The controller may be normally arranged to cause the clarified solution received from the floc-separation apparatus to flow, through a first valve, and then through a first filter, to a second location, in a first direction of flow, whilst monitoring a pressure of the clarified solution at a first pressure monitor located upstream of the filter, to provide filtered clarified aqueous solution at the second location, when the pressure is less than a first value. The controller may also be arranged to cause a cleaning solution to flow through the first filter, and then through the first valve, from a third location, in a second direction of flow, opposite to the first direction of flow, when the pressure attains or exceeds the first value and for a predetermined period of time thereafter, whilst halting the flow of the clarified solution through the first filter, and arranging the first valve to divert the cleaning solution to a fourth location when flowing in the second direction. When the predetermined time period has elapsed, the controller may be arranged to halt the flow of the cleaning solution and causing the clarified aqueous solution to flow again in the first direction of flow, from the floc-separation apparatus to the second location, through the first valve and the first filter, whilst monitoring the pressure of the clarified solution at the first pressure monitor.

Preferably, the second location may be a holding tank adapted for retaining filtered clarified aqueous solution, and may be the same as the third location, such that the cleaning solution is filtered clarified aqueous solution which has already passed at least once through the filtration apparatus. The fourth location may an inlet to the floc-separation apparatus, so that the mixing of the dislodged sediment with the aqueous dispersion, prior to separation of flocculated particles and their removal, may lead to the dislodged sediment becoming entrapped within the separated flocculated particulate material for disposal.

The filtration apparatus may comprises one or more further filters in addition to the first filter, each further filter having a respective valve and a respective pressure monitor, with the controller arranged to control flow through the further filters in the same manner that it is arranged to control flow through the first filter, mutatis mutandis.

The controller may be arranged to halt the flow of the clarified solution in the first direction through one or more of the filters, and also be arranged to divert the flow of the clarified aqueous solution to pass though other filters for which flow is not halted.

In other words, each filter may be cleaned by halting filtration, and sending a reverse flow of cleaning solution, for a predetermined time, through the filter, to dislodge sediment deposited on the filters, when the pressure monitored at the inlet to the filter reaches a predetermined value. The filtered solution may be recirculated as cleaning solution and the solution containing dislodged sediment may be recirculated to be trapped in the flocculated component, allowing for a self-contained self-cleaning system.

The plant of the first aspect of the invention may include a plurality of flow-through assemblies for electrocoagulation treatment arranged in parallel, with the controller is arranged to direct the waste water flow through each flow-through assembly according to demand and/or a maintenance schedule. Hence, if rate of flow of the aqueous dispersion through the electrocoagulation (EC) flow-through assembly is a rate determining step at certain times, the controller may switch the plant to utilise two or more flow-through electrocoagulation assemblies. When one of the flow-through electrocoagulation assemblies has become inefficient over a usage period, for instance due to need for cleaning or for replacement of sacrificial electrodes, then the flow may be switched from the inefficient EC flow-through assembly to a different EC flow-through assembly so that the clogged filter may be cleaned without halting the continued operation of the waste stream treatment plant The plant according to the first aspect of the invention may preferably have one or more free-standing containers holding all of the other apparatuses comprising the plant therein in use, the one or more containers comprising:
an inlet for the waste stream;
an outlet for clarified aqueous solution;
a power connector for input of electrical power to the apparatuses comprising the plant.

This provides the benefit that the free-standing container(s) may be rapidly transported to a site when needed (for instance in case of the breakdown of an existing waste stream treatment plant) and set up to operate in a free-standing manner outside the site, for instance standing on a car park or ground adjacent to the site. This arrangement, in addition to allowing for rapid commissioning of a new or replacement waste stream treatment plant, also ensures a low risk of cross contamination between the manufacturing operations generating the waste stream to be treated and the containerised, free-standing waste stream treatment plant.

Suitably, the container or containers may be so-called intermodal containers, also sometimes referred to as freight containers, designed in accordance with international standards to allow easy transportation by different modes of transport, such as rail, air, road or freight train.

A second aspect of the invention provides a method for treating a waste water stream comprising fat to, provide a clarified aqueous solution, the method comprising sequentially:
a) removing liquid oil and gross contaminants from the waste water stream to provide a remaining aqueous dispersion comprising fat particles dispersed in aqueous solution;
b) subjecting the aqueous dispersion to electrocoagulation treatment to promote formation of a flocculate comprising the fat particles; and
c) collecting the flocculate comprising the fat particles as a flocculated fat-containing layer from the aqueous dispersion and removing the flocculated fat-containing layer to provide a remaining clarified aqueous solution.

The preferred and optional features set out in relation to the first aspect of the invention are also applicable to the second aspect of the invention.

The method of the second aspect of the invention may further comprise blending an aqueous solution of a gas with the aqueous dispersion of particles, prior to separating the flocculate from the remaining clarified aqueous solution, wherein the aqueous solution is arranged to be supersaturated with the gas on blending, for example by using the apparatus and methods as set out elsewhere herein.

The aqueous supersaturated gas solution may suitably be formed by subjecting a portion of the clarified solution to gas at a pressure higher than the pressure of the aqueous dispersion on blending with the aqueous supersaturated solution of gas. In this way, no additional clean water supply is needed in order to form the supersaturated solution of gas.

In the method of the second aspect of the invention, the electrolyte content of the aqueous dispersion may increased, prior to electrocoagulation treatment, whereby a current and a voltage used for the electrocoagulation treatment may be maintained at level to promote sufficient formation of the flocculate comprising the fat particles. As explained hereinbefore, this may be advantageous for reduction in electrical power consumption.

Alternatively or additionally, the method may comprise applying a voltage V across the opposed electrodes whereby a current C is passed between the opposed electrodes through the sacrificial electrodes, whereby the sacrificial electrodes donate cations to the aqueous dispersion, wherein the voltage is maintained at a value $V_{max}$ when the conductivity of the aqueous dispersion is $S_{min}$ or less and wherein the voltage is allowed to decrease to values less than $V_{max}$ as the conductivity of the aqueous dispersion increases.

The method may involve the voltage between the electrodes being maintained at a value $V_{max}$ when the conductivity of the aqueous dispersion is $S_{min}$ or less and wherein the voltage is allowed to decrease to values less than $V_{max}$ when the conductivity of the aqueous dispersion is greater than $S_{min}$. In this way, the current passing between the electrodes may be determined by the conductivity of the aqueous dispersion when the conductivity of the aqueous dispersion is $S_{min}$ or less: as the voltage remains at $V_{max}$ for these low conductivities, the current will decrease in accordance with Ohms law as the conductivity decreases below the value $S_{min}$. For treatment of aqueous dispersions where the electrolyte concentration, and hence conductivity, of the aqueous dispersion, increases or decreases along with the concentration of particulate matter in the aqueous dispersion, when the conductivity of the aqueous dispersion falls below the level $S_{min}$, it follows that there may only be low levels of particulate matter required for flocculation and so lower levels of dissolved coagulant may be required from the sacrificial electrodes. As the amount of coagulant increases or decreases with the amplitude of the current, at conductivity levels below $S_{min}$, the current may be allowed to decrease as the conductivity decreases (i.e. as resistance between the first and second electrodes increases). As the electrical power consumption is (current)$^2$×resistance, or (voltage)$^2$/resistance, by not allowing the voltage to exceed $V_{max}$, as the conductivity drops below $S_{min}$, the power consumption of the electrocoagulation process may be reduced as the current is allowed to decrease when lower levels of coagulant are acceptable.

Suitably, $V_{max}$ may be from 240 to 520 V. It will be understood that for any particular aqueous dispersion, the skilled person will easily be ably to establish a value for $S_{min}$, by simple measurement of the particulate levels following flocculation and separation, in order to ensure that a required level of particulate removal is achieves, for instance so that the separated, purified water may meet local requirements for disposal or re-use.

A current from $C_{min}$ to $C_{max}$ may be passed between the opposed electrodes when the conductivity of the aqueous dispersion in the flow-through cell has a value in excess of $S_{min}$, and the current may be allowed to fall below $C_{min}$ when the conductivity of the aqueous dispersion in the flow-through cell has a value of $S_{min}$ or less.

In this way, it may be ensured that when the conductivity is above a certain level, and so the level of particulates in the aqueous dispersion is also correspondingly high, the current is maintained at a sufficient level to ensure that an adequate level of coagulant is present for particulate flocculation and separation to subsequently take place, following passage of the aqueous dispersion through the electrocoagulation apparatus.

$S_{min}$ may be such that the current passed between the opposed electrodes, when the voltage applied is $V_{max}$, is from 5 to 20 A.

The conductivity of the aqueous dispersion may be measured by a conductivity monitor. Alternatively or additionally, the conductivity of the aqueous dispersion may be derived from measurements of the voltage and current across the opposed electrodes.

The current may maintained at a substantially constant value $C_{min}$ when the conductivity of the aqueous dispersion is in excess of $S_{min}$ and the voltage is in excess of a value $V_{min}$, and the current may be controlled to increase up to a value $C_{max}$ to maintain a substantially constant voltage $V_{min}$ across the first and second electrodes when the conductivity of the aqueous dispersion is in excess of a value ($S_{max}$) such that the current $C_{min}$ corresponds to the voltage $V_{min}$ at that conductivity.

The current may be maintained at a constant value $C_{min}$ over the conductivity range from $S_{min}$ to $S_{max}$, or it may be desirable to control the current and voltage such that the current increases from $C_{min}$ at a conductivity of $S_{min}$ to a current up to $C_{max}$ corresponding to the conductivity of $S_{max}$. In one suitable arrangement according to the invention, the electrical power consumption may be maintained substantially constant over the range $S_{min}$ to $S_{max}$, with the current increasing as the electrical resistance between the opposed electrodes decreases as the conductivity increases.

In one exemplary embodiment according to the invention, an electrolyte may added to the aqueous dispersion when the conductivity of the aqueous dispersion prior to electrolyte addition is $S_{crit}$ or less, but greater than $S_{min}$, where $S_{crit}$ is greater than $S_{min}$, whereby the conductivity of the aqueous dispersion in the flow-through cell after electrolyte addition is $S_{crit}$ or more.

This arrangement means that in a situation where the aqueous dispersion still contains high levels of particulates which need to be flocculated, yet has a low conductivity associated with the aqueous portion of the aqueous dispersion such that an excessive electrical power consumption would occur at the desired current for dissolution of adequate flocculant from the sacrificial electrodes, then by the addition of further electrolyte to the aqueous dispersion, it can be arranged that the conductivity of the aqueous dispersion is increased so that an adequate level of current may still be passed through the aqueous dispersion in order to generate sufficient dissolved sacrificial electrode material to provide adequate flocculation, without excessive electrical power being required. The added electrolyte may reduce the conductivity of the aqueous dispersion so that a higher current may be passed through the aqueous dispersion without excessive electrical power consumption that would otherwise be associated with such current if the conductivity of the aqueous dispersion had not been decreased by addition of electrolyte.

For this exemplary embodiment of the invention, it may be arranged that no electrolyte is added to the aqueous dispersion when the conductivity of the aqueous dispersion prior to electrolyte addition is $S_{min}$ or less.

Once again, it will be understood that the value chosen for $S_{crit}$ will depend upon the nature of the particular aqueous dispersion being treated, and $S_{crit}$ will be easily determinable, for instance by setting an upper limit on electrical power consumption that may be tolerated alongside the maximum particulate levels that are acceptable following flocculation and separation of the purified water from the aqueous dispersion.

The electrolyte may be added as a sodium chloride solution having a greater conductivity than $S_{crit}$.

The conductivity of the aqueous dispersion prior to any electrolyte addition may be derived from measurements of the voltage and current across the first and second electrodes and the quantity of any electrolyte added to the aqueous dispersion.

In order to prevent excessive build-up of oxide/debris on the sacrificial electrodes, the method of the invention may also involve periodically reversing the polarity of the voltage applied across the first and second electrodes with an interval T between the current having zero amplitude at each reversal. It will be understood that this switches the cathodic surfaces to become anodic surfaces and vice versa for the opposed electrodes and for the sacrificial electrodes. The interval T is suitably from 1 to 60 minutes, such as from 2 to 30 minutes. Shorter intervals than 1 minute may not allow sufficient time for removal of oxide/debris layers from the electrodes following reversal, whereas intervals longer than 1 hour can lead to excessive consolidation of oxide/debris layers whereby removal is more difficult.

The method of the invention may also comprise periodically reversing the polarity of the voltage applied across the opposed electrodes with an interval T between the current having zero amplitude at each reversal, wherein following each reversal of polarity, the aqueous dispersion flow rate through the region between the first and second electrodes is arranged to have a value of $F_R$ or more, for a period $T_R$ of 0.05T or more, wherein $F_R$ is $1.1F_M$ or more, and wherein $F_M$ is the mean flow rate between each reversal.

Following each reversal of polarity, the aqueous dispersion flow rate through the region between the opposed electrodes is arranged to have a value of $F_R$ or more, for a period $T_R$ of 0.05T or more, wherein $F_R$ is $1.1F_M$ or more. $F_M$ is the mean flow rate between each reversal. In other words, for the period $T_R$, the flow rate of the aqueous dispersion is increased to a level which is at least 1.1 times the mean flow rate between reversals, and which may be even more, say up to 6 times the mean flow rate between reversals. The mean flow rate between reversals is simply the time integral of the flow rate as a function of time over the period T, divided by T. Without wishing to be found by any theory, it is thought that the high level of flow rate for the period $T_R$ results in the oxide/debris layer, formed on the opposed and sacrificial electrodes during the previous period T, being removed in a synergistic manner when combined with the reversal of current leading to electrostatic repulsion of the oxide/debris particles on the electrodes.

The flow rate of the aqueous dispersion may, for instance, be controlled by means of a pumping arrangement, such as a pump in a feed line running from a storage tank for the aqueous dispersion to an electrocoagulation chamber holding the electrodes.

Alternatively or additionally, the current may be varied between each reversal, with or without the flow rate being varied. Hence, the method may comprise periodically reversing the polarity of the voltage applied across the first and second electrodes with an interval T between the current having zero amplitude at each reversal, wherein following each polarity reversal, the amplitude of the current is controlled to have an amplitude of $C_R$ or more, for a period $T_P$ of 0.05T or more, wherein $C_R$ is $1.1C_M$ or more, and wherein $C_M$ is a mean current amplitude between each reversal.

$C_R$ may be $1.2C_M$ or more, such as $1.3C_M$ or more, for instance $1.5C_M$ or more. However, $C_R$ is suitably $5C_M$ or less, such as $4C_M$ or less or $3C_M$ or less. It will be understood that the amount of dissolved sacrificial electrode material will depend upon the value of current, so excessively high currents may lead to excessively rapid degradation of the sacrificial electrodes.

Without wishing to be bound by any theory, it is thought that the increase in the current following reversal may assist in repelling oxide/debris from the relevant surfaces of the sacrificial electrodes.

The period $T_P$ may be 0.1T or more. $T_P$ should be less than 0.5T, preferably less than 0.4T and more preferably less than 0.3T. It will be understood that when the current amplitude is higher, the level of dissolved sacrificial electrode material entering the aqueous dispersion, for a particular current value, will be higher than it would be when the current amplitude is at a lower value.

The current amplitude may be maintained at a substantially constant value over the period $T_P$, or may vary provided it remains in excess of $C_R$.

Following each period $T_P$ the current amplitude may be reduced to a substantially constant value $C_C$ over a current drop period of 0.05T or less, and maintained at $C_C$ until a subsequent reversal. The current amplitude may be controlled to increase monotonically from zero at reversal to a value of $C_R$ or more within a current rise period of 0.05T or less.

In accordance with the method of the second aspect of the invention, any particulate filters used for further removal of particulate sediment may cleaned by the following method:
i) causing the clarified aqueous solution to flow into the filtration apparatus from a first location, through a first valve, and then through the first filter, to a second location, in a first direction of flow, whilst monitoring a pressure of the clarified solution at a first pressure monitor located prior to passage through the filter, to provide filtered clarified aqueous solution at the second location when the pressure is less than a first value;
ii) when the pressure is greater than or equal to a first value, halting the flow of the clarified solution through the first filter and causing a cleaning solution to flow through the first filter, and then through the first valve, from a third location, in a second direction of flow, opposite to the first direction of flow, and wherein the first valve is arranged to divert the cleaning solution to a fourth location when flowing in the second direction; and
iii) after a predetermined period of time, halting the flow of the cleaning solution and causing the clarified aqueous solution to flow again in the first direction of flow, from the first location to the second location, through the first valve and the first filter, whilst monitoring the pressure of the clarified aqueous solution at the first pressure monitor.

DETAILED DESCRIPTION

Figure 2:
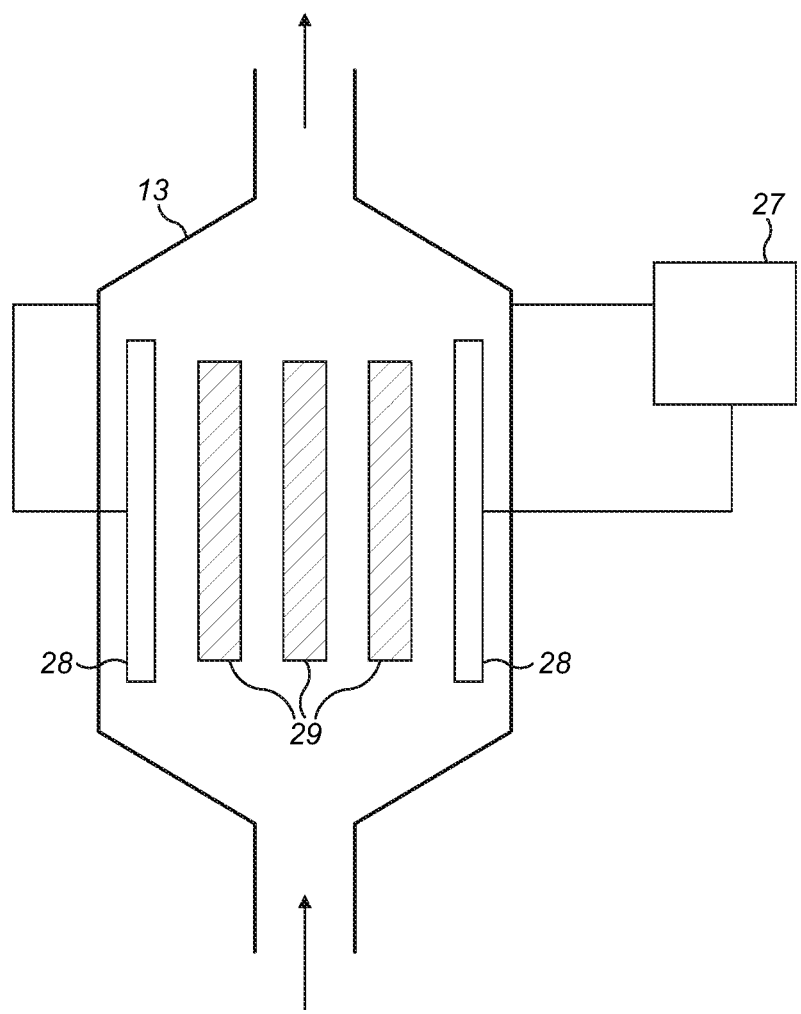

For a better understanding of the invention, and to show how exemplary embodiments of the same may be carried into effect, reference will be made, by way of example only, to the accompanying diagrammatic Figures, in which:

FIG. 1 schematically depicts a schematic representation of an embodiment of a waste stream treatment plant according to the first aspect of the invention;

FIG. 2 schematically depicts a more detailed cross-sectional side view of the flow-through electrocoagulation (EC) assembly for use in the plant of the first embodiment as shown in FIG. 1.

Common reference numerals have been used throughout the Figures, and in the description, as set out below, reference is made to the same embodiment of the invention with the various features of the embodiment illustrated in the Figures. For the sake of clarity, connections between the controller 10 and the various pumps P, meter 7, power supply 27 and flow control valves 12, 22 have not been shown in the Figures. It should be understood that such connections will be present in the embodiment as set out in the Figures, even though not indicated directly, and the connections may be implemented as hard-wired connections, wireless connections or a mixture of these.

Turning to FIG. 1, which shows a schematic depiction of an embodiment of a waste treatment plant according to the first aspect of the invention, a waste water stream enters the plant of the embodiment at an inlet I from an adjacent manufacturing site. The waste water stream is first passed through a pre-treatment apparatus which consists of a skimming tank 1 for removal of oil from the waste water stream by skimming a floating oil layer 2 from the waste water stream. This is indicated in FIG. 1 by an oil collection gutter 3 which removes the surface layer of floating oil 2 and any other matter trapped in the floating layer of oil by collecting the oil from the surface of the skimming tank 1 and draining it to waste W. The remaining aqueous dispersion, of particles dispersed in an aqueous solution, is transferred from the skimming tank 1 by a pump P1 to a nozzle 37 through which it is sprayed onto a screening apparatus 6 having a cylindrical sieve in the form of a drum 4 arranged to rotate about an axle 5.

Coarse particulate matter is captured on the outer surface of the rotating sieve drum 4 and jets of water 32 are emitted from the axle 5 in order to dislodge the coarse particulate matter collected on the outer face of the sieve drum 4 so that the particles can be washed to waste W.

From the screening apparatus 6, the aqueous dispersion, now containing predominantly colloidal particles, is transferred by a further pump P2 through a pH and conductivity meter 7 into a balancing tank 11. The balancing tank 11 is provided with a recirculation pump P3 and reagent dosing tanks 8, 9 are positioned to pump reagent (i.e. solutions of chemicals in this case) into the balancing tank 11 through pumps P8 and P9. The dosing of the reagents from dosing tanks 8, 9 via the pumps P8, P9 is controlled by the controller 10 in response to the values of pH and conductivity measured by the meter 7 and transmitted from the meter 7 to the controller 10. As explained below, the controller 10 may also dose the reagents in response to the measured fat content of the output clarified aqueous solution from the plant, for instance to increase conductivity so that more current can be supplied to the electrocoagulation treatment in order to increase flocculation without excessive power drain.

A baffle, 33 is positioned at the outlet to the balancing tank 11 in order that the circulation pump P3 mixes the reagents with the aqueous dispersion prior to exit from the balancing tank 11. The baffle is positioned to present direct flow of reagent from the dosing tanks 8, 9 through the outlet of the balancing tank 11.

The aqueous dispersion is transferred from the balancing tank 11 by pump P11 through a flow control valve 12 which determines through which of two flow-through electrocoagulation chambers 13, 14, the aqueous dispersion will flow. A power supply 27 is provided to supply a voltage across the opposed electrodes 28 of the flow-through electrocoagulation chambers 13, 14 and this is shown in more detail in FIG. 2 for the flow-through electrocoagulation chamber 13. For this embodiment, the opposed electrodes 28 are of steel while the sacrificial electrodes 29 are of aluminium. With such an arrangement, the steel electrodes may endure through many replacement, or refurbished, sets of aluminium sacrificial electrodes.

A voltage is applied, by power supply 27, across the opposed electrodes 28, and the resulting electric field causes the sacrificial electrodes 29 to have cathodic and anodic surfaces, with the material of the sacrificial electrodes oxidising and dissolving at the anodic surfaces and hydrogen bubbles being generated at the cathodic surfaces. Typically, a voltage of 50 to 600V may be applied, with a direct current, such as up to 60 A, for instance from 1 to 55 A, say from 5 to 20 A passing between the opposed electrodes 29 and through the sacrificial electrodes. In order to prevent excessive build-up of oxide on the sacrificial electrodes, the direct current may be reversed at intervals in order to switch the cathodic surfaces to become anodic surfaces and vice versa.

The controller 10 controls the aqueous dispersion to flow through either one of, or both of, the flow-through electrocoagulation chambers 13, 14 depending upon circumstances, such as total volume of waste stream entering at the inlet I, the condition of the electrodes (e.g. whether cleaning is required or whether the sacrificial electrodes 29 are nearly spent), or optionally the fat content of the outlet aqueous solution from the plant.

From the flow-through chambers for electrocoagulation treatment 13, 14, the aqueous dispersion, now also comprising hydrogen bubbles and dissolved cations from the sacrificial electrodes 29, passes to a floc-separation apparatus 15 in the form of a settling tank 15 through which the aqueous dispersion 17, following the electrocoagulation treatment, gently flows from an inlet 38 to an outlet 35 in order to allow time for the fat particles dispersed within the aqueous dispersion to flocculate and so to form a flocculated fat-containing layer 16 of lower density than the remaining clarified aqueous solution 17.

The settling tank is provided with a blade 18 arranged to move to-and-fro while positioned over the surface of the settling tank 15 in order to scrape the flocculated fat-containing layer 16 over a rim of the settling tank into a sump 30 for collection and disposal to waste W.

In addition to the outlet 35 arranged for the exit of the bulk of clarified aqueous solution 17 from the settling tank 15, a further outlet 34 is provided in the base of the settling tank 15, positioned to collect sediment, so that any sediment which is denser than the clarified aqueous solution will collect at this outlet 34 and can be removed at intervals using pump P12 to go to waste W.

From the outlet 35, a pump P 13 transfers the clarified aqueous solution 17 to a filtration tank 36 and from the filtration tank 36 the clarified aqueous solution 17 passes through one or more of the particulate filters 20, 21 in accordance with flow control valve 19, which is controlled by the controller 10 to deliver the clarified aqueous solution 17 to the particulate filters 20, 21 depending upon the demand and/or maintenance schedule or arrangements for unblocking of the particulate filters 20, 21.

A further flow control valve 22 directs the bulk of the remaining resulting filtered clarified aqueous solution, after particulate filtration, to the outlet of the plant S and from there to one or more of:

i) re-use within the factory or manufacturing site from which it came, or ii) into the local sewage system, or iii) into the environment.

The flow control valve 22 also directs a portion of the filtered clarified aqueous solution into a pressure tank 23 through the pump P22. A gas source 24 provides pressurised gas 25 over filtered clarified aqueous solution 26 held in the pressure tank 23, and in this embodiment a gas pressure of 5 bar is used in order to dissolve the gas (in this case air) into the filtered clarified aqueous solution 26 to form an aqueous solution of gas 26 under pressure. Pump P26 is arranged to pump the resulting aqueous solution of gas through pressure control valve 31 under the control from the controller 10 in order to blend the aqueous solution of gas with the aqueous dispersion at the pressure control valve 31 before the aqueous dispersion enters the floc-separation tank 15.

As explained hereinbefore, the blending of the aqueous solution of gas which is supersaturated with gas at the prevailing conditions after blending, with the aqueous dispersion 17, which already includes hydrogen bubbles generated during the electrocoagulation process, results in improved flotation and separation of the fat-containing layer 16 following flocculation, and it is thought that this may be due to improved nucleation of gas bubbles of a suitable size, and their subsequent incorporation within the flocculated fat containing layer 16, improving its buoyancy and so improving rate of separation from the remaining clarified aqueous solution 17.

The plant according to the invention may also include a meter to monitor the remaining fat content of the filtered clarified aqueous solution, for instance a clarity meter, such as a nephelometer, arranged to measure the turbidity of the solution at the exit S, and the controller 10 may adjust the electrocoagulation conditions (current/voltage) and may adjust the reagent dosing at the balancing tank 11 in order to control the fat content to meet a specific requirement whilst minimising the electrical power input used in the electrocoagulation assembly.

In summary, the invention provides a plant and method for treatment of a waste water stream comprising fat, including pre-treatment apparatus for removal of liquid oil and gross contaminants, a flow-through assembly for electrocoagulation treatment of a liquid, a floc-separation apparatus arranged for removal of a flocculated fat-containing layer from the aqueous dispersion to provide clarified aqueous solution for disposal and a controller arranged to control voltage and/or current across the electrodes and the flow of the waste water stream through the components of the plant. The plant and method allow for efficient self-contained treatment, and minimisation of power consumption, as flow and contaminant level vary.

Although a few exemplary embodiments have been shown and described, it will be appreciated by those skilled in the art that various changes and modifications may be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A plant for treatment of a waste water stream comprising fat particles dispersed therein, the plant comprising:
   one or more free-standing containers, the one or more containers comprising:
   a) a pre-treatment apparatus for separation and removal of liquid oil and gross contaminants from said waste water stream in use to provide a remaining aqueous dispersion comprising fat particles dispersed in aqueous solution;
   b) a flow-through assembly arranged for electrocoagulation treatment of said aqueous dispersion, the assembly comprising:
      i) a flow-through chamber comprising opposed electrodes and sacrificial electrodes positioned therebetween; and
      ii) a power supply arranged to apply a voltage across the electrodes and to cause a current to flow therebetween through said aqueous dispersion in use;
   c) a floc-separation apparatus arranged for separation and removal of a flocculated fat-containing layer, formed by flocculation of said fat particles after electrocoagulation treatment of said aqueous dispersion, to provide a remaining clarified aqueous solution;
   d) a controller arranged to control voltage and/or current across the electrodes and the flow of the waste water stream through the components of the plant;
   e) an inlet for the waste stream;
   f) an outlet for clarified aqueous solution; and
   g) a power connector for input of electrical power to the apparatuses comprising the plant.

2. The plant according to claim 1 wherein the pre-treatment apparatus comprises a skimming tank configured for removal of oil from said waste water stream by skimming a floating oil layer from said waste water stream.

3. The plant according to claim 1 wherein the pre-treatment apparatus comprises a screening apparatus arranged for removal of coarse particles from said waste water stream.

4. The plant according to claim 1 further comprising a gas solution generation apparatus arranged to generate a solution of gas for blending with said aqueous dispersion.

5. The plant according to claim 4 wherein the gas solution generation apparatus comprises a chamber arranged for dissolving a gas into aqueous solution with the gas at a pressure in excess of atmospheric pressure to form said solution of gas in use, and the plant further comprises a pump arranged for blending said solution of gas with said aqueous dispersion through a valve arranged to maintain said solution of gas at a pressure higher than atmospheric pressure, prior to blending, in use.

6. The plant according to claim 5 wherein the valve is positioned to blend said solution of gas with said aqueous dispersion after the flow-through assembly but before or at entry into the floe-separation apparatus.

7. The plant according to claim 1, further comprising a composition adjustment apparatus arranged between the pre-treatment apparatus and the flow-through electrocoagulation apparatus, wherein the composition adjustment apparatus is arranged for measurement and adjustment of the pH and/or conductivity of said aqueous dispersion.

8. The plant according to claim 7 wherein the composition adjustment apparatus comprises a balancing tank arranged for recycling the aqueous dispersion through the balancing tank and one or more reagent dosing apparatuses arranged for dosing one or more reagents into the balancing tank to bring said aqueous dispersion to a required pH and/or conductivity.

9. The plant according to claim 1 wherein the floc-separation apparatus comprises a settling tank arranged for collecting said flocculated fat-containing layer by flotation over said remaining clarified aqueous solution and arranged for separate removal of said aqueous clarified solution and said fat-containing flocculated layer from the settling tank.

10. The plant according to any claim 1 further comprising a particulate filtration apparatus arranged downstream of the floc-separation apparatus and arranged to remove fine particulate solids from the clarified aqueous solution.

11. The plant according to claim 10 wherein the particulate filtration apparatus comprises a plurality of particulate filters, wherein the controller is arranged to direct the waste water flow through each particulate filter according to demand and/or a maintenance schedule.

12. The plant according to claim 1 comprising a plurality of flow-through assemblies for electrocoagulation treatment arranged in parallel, wherein the controller is arranged to direct the waste water flow through each flow-through assembly according to demand and/or a maintenance schedule.

13. The plant according to claim 1 wherein the one or more containers are intermodal containers.

14. A method for treating a waste water stream comprising fat to, provide a clarified aqueous solution, the method comprising sequentially:
a) removing liquid oil and gross contaminants from the waste stream to provide a remaining aqueous dispersion comprising fat particles dispersed in aqueous solution;
b) subjecting the aqueous dispersion to electrocoagulation treatment to promote formation of a flocculate comprising the fat particles; and
c) collecting the flocculate comprising the fat particles as a flocculated fat-containing layer from the aqueous dispersion and removing the flocculated fat-containing layer to provide a remaining clarified aqueous solution;
wherein the method is carried out in a plant outside a site generating the waste water stream, the plant comprising one or more free-standing containers holding all apparatuses required for carrying out the method, the one or more containers further comprising:
an inlet for the waste stream;
an outlet for clarified aqueous solution; and
a power connector for input of electrical power to the apparatuses comprising the plant.

15. The method according to claim 14 further comprising blending an aqueous solution of a gas with the aqueous dispersion of particles, prior to separating the flocculate from the remaining clarified aqueous solution, wherein the aqueous solution is arranged to be supersaturated with the gas on blending.

16. The method according to claim 15 wherein the solution of gas is formed by subjecting a portion of the clarified aqueous solution to gas at a pressure higher than the pressure of the aqueous dispersion on blending with the aqueous supersaturated gas solution.

17. The method according to any one of claim 14 wherein an electrolyte content of the aqueous dispersion is increased, prior to electrocoagulation treatment, whereby a current and a voltage used for the electrocoagulation treatment may be maintained at level to promote sufficient formation of the flocculate comprising the fat particles.

18. The method according to claim 14 wherein the one or more containers are intermodal containers.

* * * * *